ately connected to one of the

United States Patent
Seymour et al.

[15] 3,658,137
[45] Apr. 25, 1972

[54] INDEPENDENT FRONT AND REAR LIFT SYSTEM

[72] Inventors: Shaun A. Seymour, Lebanon, Ohio; Hugh E. Smith, New Holland, Pa.

[73] Assignee: Sperry Rand Corporation, New Holland, Pa.

[22] Filed: Oct. 5, 1970

[21] Appl. No.: 78,064

[52] U.S. Cl. ...................... 172/300, 172/469, 172/488, 172/668, 280/490, 154/124
[51] Int. Cl. ...................................A01b 59/048
[58] Field of Search............172/458, 468, 469, 473, 488, 172/489, 300, 299, 301, 302, 619, 633, 657, 658, 304; 254/124; 280/408, 409, 410, 456, 490, 479

[56] References Cited

UNITED STATES PATENTS

| | | | |
|---|---|---|---|
| 2,337,764 | 12/1943 | Mott | 172/301 |
| 2,280,342 | 4/1942 | Mott et al. | 172/301 X |
| 2,309,221 | 1/1943 | Smith | 172/301 |
| 2,324,867 | 7/1943 | Mott et al. | 172/301 |
| 2,482,751 | 9/1949 | Hartsock et al. | 172/300 |
| 2,426,530 | 8/1947 | Silver | 172/469 X |
| 2,298,540 | 10/1942 | Mott | 172/302 |

*Primary Examiner*—Robert E. Pulfrey
*Assistant Examiner*—R. T. Rader
*Attorney*—Joseph A. Brown, John C. Thompson, James J. Kennedy and George C. Bower

[57] ABSTRACT

An independent front and rear lift means for a tractor that is hydraulically actuated by a single double acting cylinder in which each end thereof is operatively connected to one of the lift means. Disposed adjacent the cylinder is a locking mechanism for selectively anchoring either end of the cylinder whereby the other or free end may drive the lift means connected thereto.

12 Claims, 6 Drawing Figures

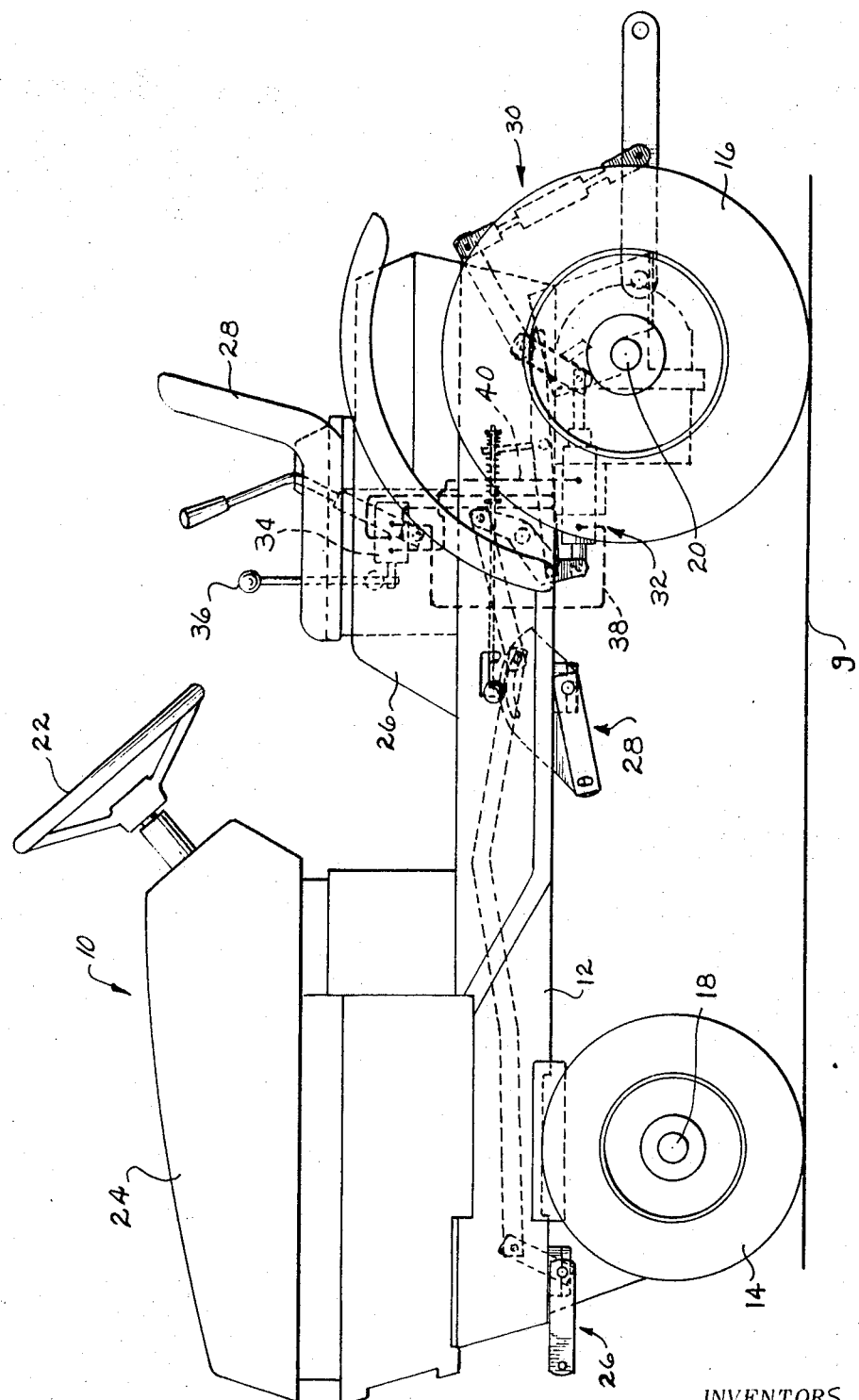

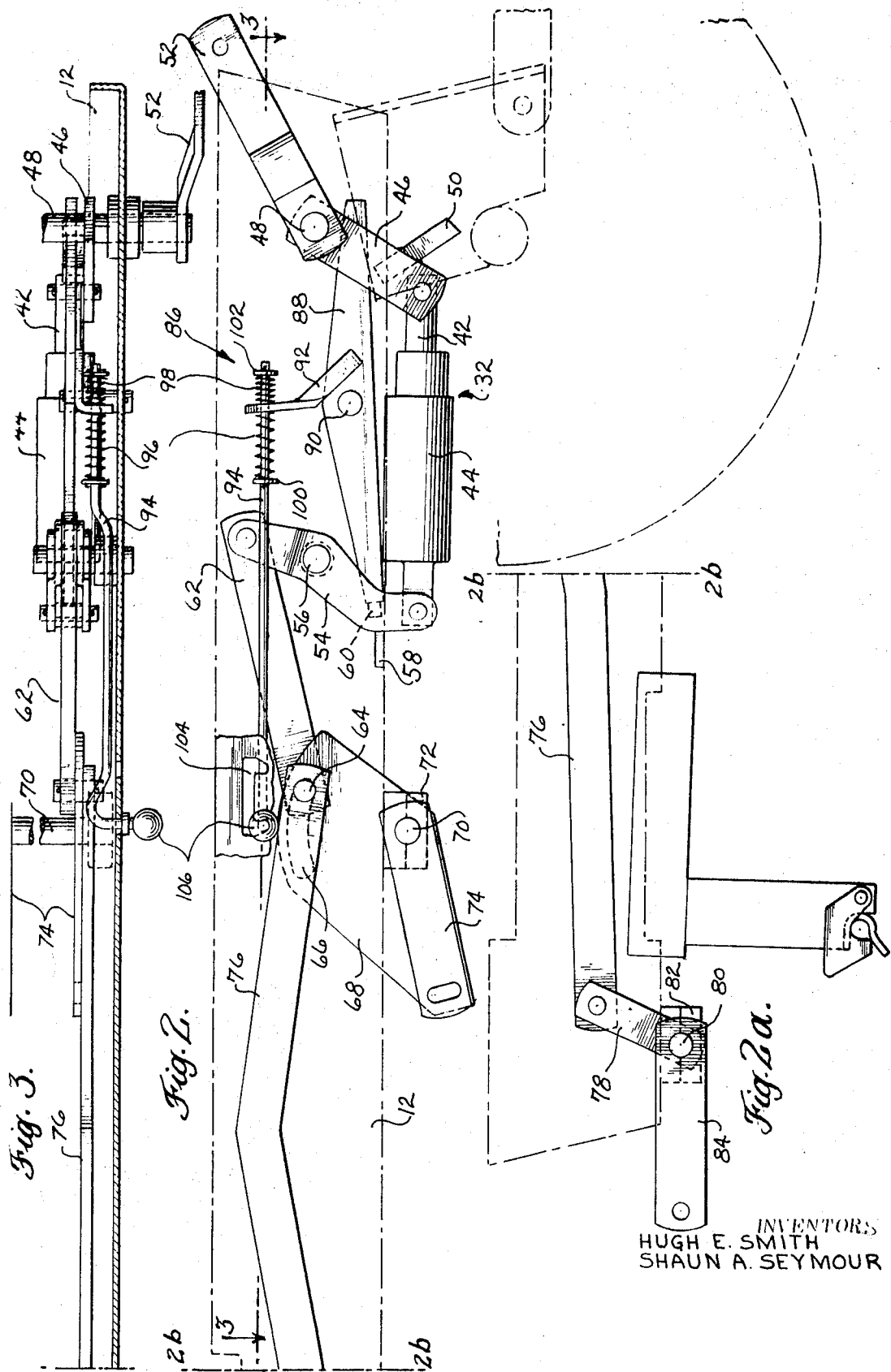

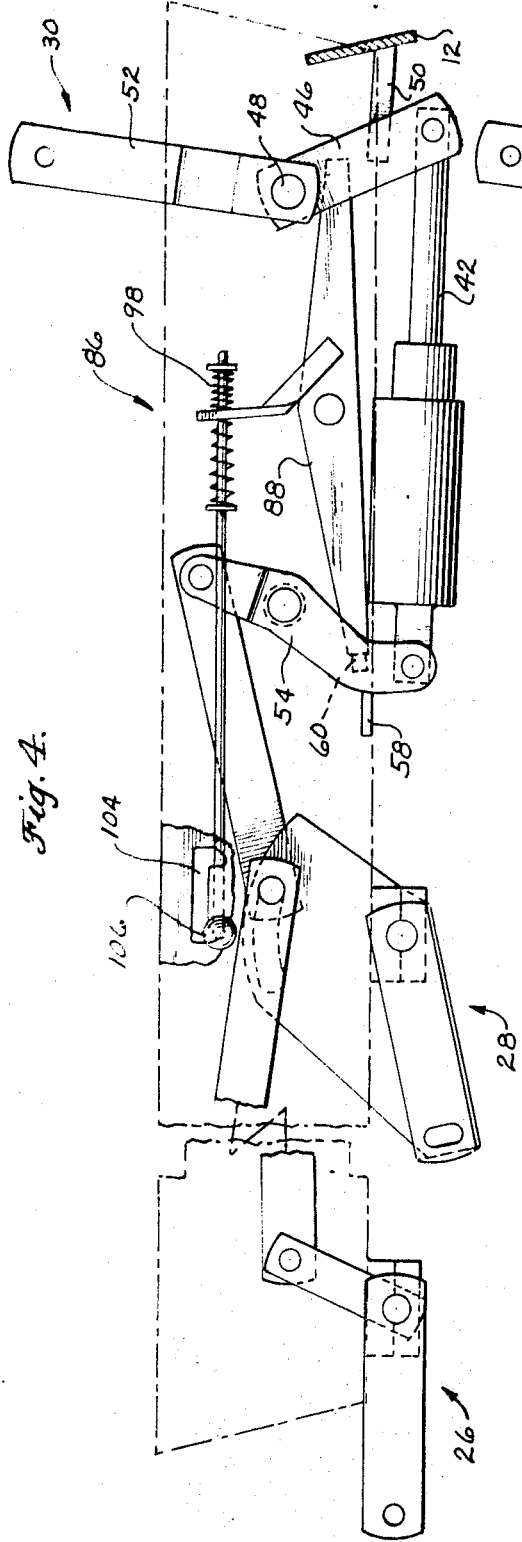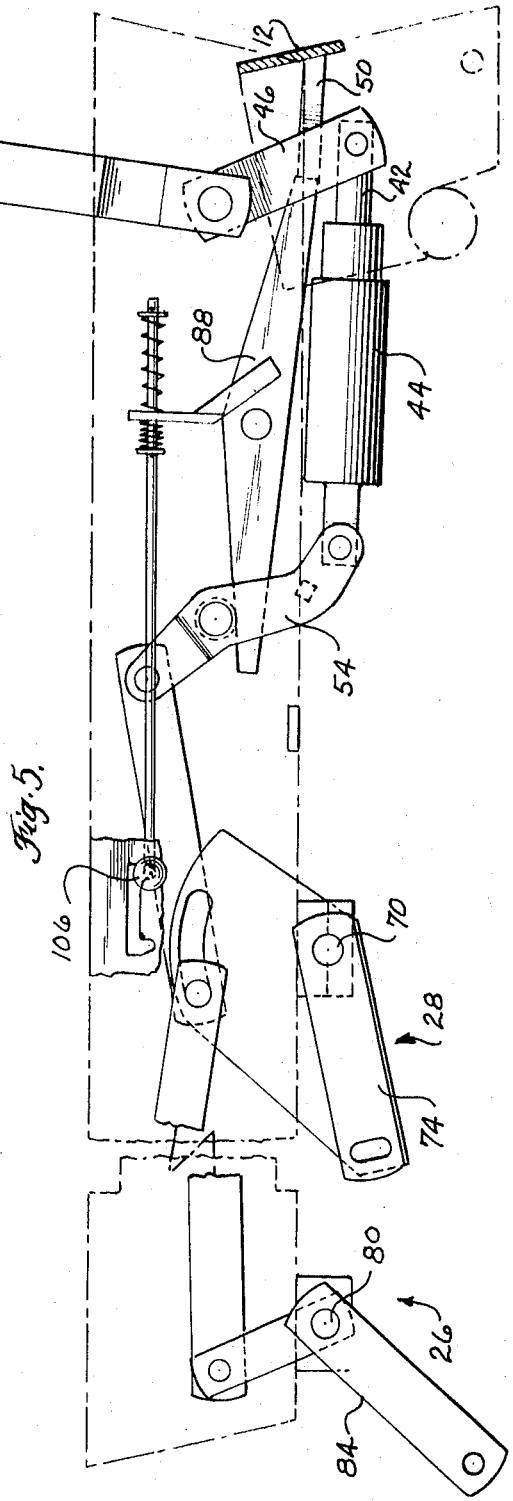

3,658,137

INDEPENDENT FRONT AND REAR LIFT SYSTEM

BACKGROUND OF THE INVENTION

In the past tractors, including those commercially referred to as utility or lawn and garden tractors, have incorporated multiple lift means into their design. Such multiple lift means are quite desirable since they give the tractor the capability of carrying more than one implement during a single field operation and enable the tractor to accommodate front, intermediate, and rear mounted implements. The latter advantage of accommodating front, intermediate, and rear mounted implements is particularly significant with the lawn and garden tractor because of the almost universally accepted intermediately mounted rotary mower and the increasing popularity of optional front and rear mounted implements such as snow blowers, blades, and rotary tillers. But with the limited size of the lawn and garden tractor, as contrasted with a conventional farm tractor, it has been difficult, and in fact awkward, to provide each lift means with a separate control cylinder, not to mention the costs associated therewith.

SUMMARY OF INVENTION

With the foregoing in mind, applicants have devised a front and rear lift means in which either may be selectively actuated independently of the other by a single double acting hydraulic cylinder. The cylinder, having a piston portion telescopically contained within a housing portion, is operatively connected between the front and rear lift means, the housing portion being connected to the front lift means while the piston portion is connected to the rear lift means. Mounted adjacent the cylinder is a locking mechanism for selectively anchoring either the housing or piston portion of the cylinder, whereby the free or non-anchored portion may drive the particular lift means connected thereto.

It is therefore the primary object of the present invention to provide a front and rear lift means in which either may be selectively actuated independently of the other by a single cylinder.

More specifically it is the object of the present invention to provide a locking means that is moveably engageable with either end of a cylinder for anchoring, whereby the non-anchored or free end may drive a lift means connected thereto.

Another object of the present invention is to provide a locking mechanism including outer stops for limiting the outward movement of the cylinder ends and a spring loaded swaybar selectively moveable from a first to a second position for limiting the inward movement of either cylinder end.

Other objects and advantages of the present invention will become apparent and obvious from a study of the following description and the accompanying drawings which are merely illustrative of the present invention.

DESCRIPTION OF THE DRAWINGS

FIG. 1 is a diagrammatic side elevational view of a lawn and garden tractor constructed in accordance with the present invention including multiple hydraulic lift systems for carrying implements, the elements of the lift systems being illustrated in the position they assume when an implement is mounted at the rear of the tractor.

FIG. 2 is an enlarged side elevational view of the right-hand portion of the cylinder control, the locking means, and the lift means with the tractor chassis shown in phantom so as to not hide elements thereof.

FIG. 2a is a continuation of FIG. 2 to the left starting at the line 2b—2b indicated in FIG. 2.

FIG. 3 is a fragmentary plan sectional view taken through the lines 3—3 of FIG. 2.

FIG. 4 is a fragmentary side elevational view illustrating the locking means in a first position such that the housing portion of the cylinder is anchored, whereby the piston portion may drive the rear lift means.

FIG. 5 is a fragmentary side elevational view illustrating the locking means in a second position such that the piston portion of the cylinder is anchored, whereby the housing portion may drive the front lift means.

In the following description right-hand and left-hand reference is determined by standing to the rear of the tractor and facing the direction of travel.

DESCRIPTION OF PREFERRED EMBODIMENT

With reference to the drawings in detail, FIG. 1 shows a lawn and garden tractor indicated generally at 10 which includes a longitudinally extending chassis 12 which is supported about the ground g by the front and rear wheels 14, 16 rotatively mounted at opposite ends of front and rear transversely extending axles 18, 20. Front wheels 14 are steerable by a steering wheel 22 which extends upwardly and rearwardly from a forwardly mounted hood 24. Mounted above the rear of the chassis 12 is a rear deck 26 having an operator's seat 28 fixed thereto. Although not specifically shown, the tractor 10 is preferably powered by an internal combustion engine which may be adapted to drive the rear wheels 16 mechanically or hydrostatically.

Longitudinally spaced along the tractor chassis 12 are three implement lift means, a front lift means 26, and intermediate lift means 28, and a rear lift means 30. Operatively connected between the intermediate lift means 28 and the rear lift means 30 is a double acting hydraulic cylinder 32. A four-way, four-position control valve 34 having a handle 36 is connected to the cylinder 32 for controlling the flow of oil thereto by a pair of flow lines 38, 40, shown in dotted lines in FIG. 1.

Turning to FIGS. 2 and 3, the double acting hydraulic cylinder 32 is disposed inwardly of the tractor chassis 12 along the left-hand side thereof. The cylinder 32 is comprised of a rear piston portion 42 which is telescopically contained within a front housing portion 44. Pivotally secured to the rear extremity of the piston portion 42 is a rear rocker arm 46 which extends upwardly and rearwardly therefrom to a rear rockshaft 48. The rear rocker arm 46 is fixedly secured to the rockshaft 48 and includes a rear locking block 50 which is fixed to the inward side thereof. The rockshaft 48 is suitably journalled transversely within the chassis 12 for rotative movement and has a pair of lift arms 52 affixed to the opposite ends thereof.

With reference to the front of the cylinder 32, a front rocker arm 54 is pivotally secured at one end to the front extremity of the cylinder housing 44 and is pivotally supported medially thereof about a transverse axis 56. Fixed to the chassis 12, forwardly of the front rocker arm 54, is a stop 58 for limiting the outward movement of the rocker arm 54. Mounted on the inner side of the front rocker arm 54, intermediately between the pivotal connection with the cylinder housing and the axis 56, is a front locking block 60, shown in dotted lines of FIG. 2. The upper end of the front rocker arm 54 is pivotally connected to the rear end of an intermediate connecting link 62 which extends forwardly therefrom. The front end of the connecting link includes a stub shaft 64 which extends inwardly and is slideably contained within a slotted arc 66 of a drive arm 68. Drive arm 68 is fixed to an intermediate rockshaft 70 which extends transversely the tractor chassis 12 and is rotatively journalled in brackets 72 fixed to the chassis 12. Mounted to opposite ends of the rockshaft 70 and depending therefrom is a pair of lift arms 74. Pivotally secured at the rear end to stub shaft 64 is front connecting link 76 which extends forwardly therefrom. The front end of the front connecting link 76 is connected to a rocker arm 78 which drives a front rockshaft 80 (FIG. 2a). Rockshaft 80 is transversely journalled for rotative movement within front brackets 82 fixed to chassis 12 and includes lift arms 84 affixed to opposite ends thereof for rotation therewith.

A locking mechanism is indicated generally at 86 and includes a swaybar 88 disposed inwardly of the rocker arms 46, 54 in approximately the same vertical plane as the locking blocks 50 and 60. The swaybar 88 is pivotable about a transverse axis 90 and includes a guiding arm 92 fixed thereto which extends upwardly therefrom where the upper end thereof is slideably contained about the rearmost portion of a handle rod 94. A pair of like coil springs 96, 98 are disposed about the rear portion of the handle rod 94 adjacent each side of the guiding arm 92 and are compressively held thereabouts by stops 100, 102. The handle rod extends forwardly from the guiding arm 92 along the inner left side of the chassis 12 to a point above the intermediate lift means 28 where the front end thereof curls outwardly through the chassis for confinement within a C-slot 104. To facilitate moving the handle rod 94 within the C-slot 104, a knob 106 is fixed to the forward, outwardly extending end thereof.

FIG. 4 shows the locking mechanism 86 in a first position for anchoring the cylinder housing portion 44, thereby freeing the piston portion 42 to drive the rear lift means 30. In this first position the front and intermediate lift means 26, 28 are upwardly disposed since the rocker arm 54 is at its forward extreme position abutting against stop 58. Knob 106 is confined within the forward portion (first position) of C-Slot 104 which compresses the rearmost spring 98 against the upper end of the guiding arm 92. The compression of spring 98 biases the guide arm 92 and swaybar 88 downwardly to where the forward, lower edge of the swaybar 88 butts against the cylinder housing 44. At this point the front end of the swaybar butts against the locking block 60, limiting the rearward movement of the rocker arm 54 and the cylinder housing 44. Thus since the stop 58 limits the forward movement of the rocker arm 54 the cylinder housing 44 is firmly fixed. To actuate the rear lift means 30 upwardly the control valve 34 is positioned such that oil flows from the valve through flow line 38 into the front of the cylinder housing 44, thereby driving the piston portion 42 rearwardly which drives the rear rockshaft 48, through rocker arm 46, counterclockwise (FIG. 2) lifting arms 52 upwardly. As the piston is driven rearwardly the oil in the rear portion of the cylinder housing is forced out through flow line 40 back to a reservoir, not shown. To lower the rear lift means 30, the valve 34 is shifted such that oil enters the rear portion of the cylinder housing 44 via flow line 40. This forces the piston portion forwardly which drives the rockshaft 48 clockwise lowering the lift arms 52 in the process.

To hydraulically control the front and intermediate lift means 26, 28 the rear lift means is actuated upwardly to its maximum height (FIG. 4) which is limited by the abuttment of the locking block 50 affixed to the rear rocker arm 46 with the rear of the tractor chassis 12. Now with reference to FIG. 5, the knob 106 is then shifted to the rear portion of the C-slot (second position) thereby biasing the rear end of the swaybar 88 downwardly to where the rear end thereof butts against the locking block 50. Note that the downward movement of the rear end of the swaybar 88 is limited by the contact of the upper edge thereof with the axis 56. Therefore the piston portion 42 is anchored since the locking block 50 of the rocker arm 46 is confined between the swaybar 88 and the tractor chassis 12. With the piston portion 42 stationary, the housing portion 44 becomes the driving member of the cylinder 32. To raise the front and intermediate lift means 26, 28, the valve 34 is shifted such that oil flows therefrom through flow line 38 into the front of the cylinder housing 44. The movement of the oil into the front of the cylinder housing causes the housing portion 44 to move away or forwardly from the piston portion 42, driving the rocker arm 52 clockwise (FIG. 5) which in turn rotates rockshafts 70, 80 such that lift arms 74, 84 are pivoted upwardly. In like manner the lift means 26, 28 is lowered by shifting the valve 34 such that oil flows into the rear of the cylinder housing 44 by flow line 40, causing the cylinder housing 44 to move rearwardly with respect to the anchored piston portion 42.

It is apparent from the foregoing that in order to anchor either the cylinder housing 44 or piston portion 42, the lift means connected thereto must be in the raised or uppermost position such that the swaybar 88 may engage the appropriate locking block. But if, for example, the knob 106, as shown in FIG. 5, is shifted to the forward position (first position) while the front and intermediate lift means 26, 28 are down, the rearmost spring 98 will biase the lower front edge of the swaybar 88 downwardly against the top of the locking block 60. Thus when the rocker arm 54 is moved forwardly by the cylinder housing 44 to where it butts against stop 58, the locking block 60 will be positioned forwardly of the swaybar 88, allowing the front thereof to fall downwardly as shown in FIG. 4 to engage the rear edge of the block 60.

From the foregoing specifications and drawings it is obvious that the locking mechanism of the present invention affords a double acting cylinder the capability of independently actuating either of two separate lift mechanisms. By employing the locking mechanism of the present invention within a tractor, a simple, reliable, and effective means is provided for individually lifting front and rear implements while avoiding the cost of providing a separate cylinder for each of the lifting mechanisms.

The terms, "upper," "lower," "forward," "rearward" etc., have been used herein merely for the convenience of the foregoing specification and in the appended claims to describe the lift systems and their parts as orientated in the drawings. It is to be understood, however, that these terms are in no way limiting to the invention since the lift systems may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described our invention, what we claim is:

1. An independent first and second lift mechanism for a vehicle comprising in combination: a vehicle having a maneuverable chassis adapted for movement over the ground; a first and second lift means depending from said chassis; a cylinder having a housing portion and a piston portion operatively connected to said first and second lift means respectively; actuating means operatively connected to said cylinder; and locking means disposed adjacent said cylinder for selectively anchoring either of said cylinder portions whereby the other cylinder portion may actuate the lift means connected thereto.

2. An independent first and second lift mechanism as recited in claim 1 wherein said locking means includes stop means disposed outwardly from said housing and piston portions of said cylinder for limiting the outward movement thereof and inner stop means for selectively limiting the inward movement of either cylinder portion.

3. An independent first and second lift mechanism as recited in claim 2 wherein said inner stop means includes a bar moveable from a first to a second position for selectively limiting the inward movement of either said housing portion or piston portion respectively.

4. In a tractor having a maneuverable chassis for movement over the ground and first and second longitudinally spaced apart lift means depending from said chassis, the improvement comprising: a cylinder having a housing portion and a piston portion operatively connected to said first and second lift means respectively; means for selectively anchoring either portion of said cylinder, whereby the other portion may be free to actuate the lift means connected thereto; and actuating means operatively connected to said cylinder for driving the non-anchored portion thereof.

5. The combination as recited in claim 4, wherein said locking means includes limiting means disposed outwardly of said cylinder portions for limiting the outward movement thereof and inner stop means moveable from a first position to a second position for selectively limiting the inward movement of either of said cylinder portions.

6. The combination as recited in claim 5, wherein said cylinder portions are connected to said lift means by connecting means, said connecting means being moveable outwardly and inwardly in response to the movement of said cylinder portions, said connecting means being disposed such that the outward movement thereof is limited by said outward limiting means and wherein the inward movement thereof is selectively limited by said inner stop means.

7. The combination as recited in claim 6 wherein said inner stop means includes a swaybar pivotable about a transverse axis and extending longitudinally between said connecting means, said swaybar being pivotally moveable from said first position to said second position by a handle affixed thereto.

8. The combination as recited in claim 7 wherein said connecting means includes first and second rocker arms operatively connected and pivotally responsive to said housing and piston portions respectively, said rocker arms having locking blocks affixed thereto and disposed for butting engagement with said moveable swaybar, whereby the inward movement of either cylinder portion is limited by the engagement of said swaybar with the locking block of the rocker arm operatively connected thereto.

9. An independent front and rear lift mechanism for a vehicle comprising in combination: a vehicle having a maneuverable chassis for movement over the ground; a cylinder longitudinally disposed with respect to said chassis and having housing and piston portions moveable outwardly and inwardly with respect to each other; front and rear lift means depending from said chassis, said front lift means disposed generally forwardly of said cylinder and said rear lift means disposed generally rearwardly of said cylinder, each of said lift means includes a rockshaft journalled transversely of said chassis and having arms means affixed thereto for rotation therewith; front and rear rocker arms operatively connecting said housing and piston portions of said cylinder to said front and rear lift means, said rocker arms moveable outwardly and inwardly for imparting cylinder motion to said lift means; and locking means for selectively anchoring either said housing portion or piston portion, said locking means includes limiting means disposed outwardly of each of said rocker arms for limiting the outward movement thereof and a swaybar extending generally longitudinally between said rocker arms and moveable between a first and second position for selectively engaging either of said rocker arms for limiting the inward movement thereof, whereby said limiting means and said swaybar cooperate to anchor either portion of said cylinder.

10. An independent front and rear lift mechanism for a vehicle as recited in claim 9, wherein said swaybar is pivotable about a transverse axis spaced intermediately between said rocker arms and includes a connecting arm extending therefrom which is attached to a handle having an end portion that is confined within a C-slot for moving said swaybar between said first and second positions.

11. An independent front and rear lift mechanism for a vehicle as recited in claim 10 wherein said connecting arm is moveable along said handle and wherein said handle includes a pair of coil springs disposed to each side of said connecting arm, whereby said swaybar may be spring loaded to engage either of said rocker arms prior to the abuttment thereof with the respective outer limiting means.

12. An independent front and rear lift mechanism for a vehicle as recited in claim 11 wherein said cylinder is hydraulically actuated.

* * * * *